United States Patent [19]

Copeland

[11] 3,903,522
[45] Sept. 2, 1975

[54] DIRECTION-FINDING SYSTEM HAVING SLOPE CONTROL MEANS

[75] Inventor: Charles Barry Copeland, Dallas, Tex.

[73] Assignee: Texas Instruments Incorporated, Dallas, Tex.

[22] Filed: June 27, 1974

[21] Appl. No.: 483,847

Related U.S. Application Data

[63] Continuation of Ser. No. 113,401, Feb. 8, 1971, abandoned.

[52] U.S. Cl. .......................... 343/113 R; 343/16 M
[51] Int. Cl.² ........................................ G01S 5/02
[58] Field of Search .............. 343/113 R, 119, 16 M

[56] References Cited
UNITED STATES PATENTS

| | | | |
|---|---|---|---|
| 3,064,254 | 11/1962 | Dickey, Jr. ..................... | 343/16 M |
| 3,175,217 | 3/1965 | Kaiser, Jr. et al. ............... | 343/113 R |
| 3,480,960 | 11/1969 | Zulch et al. ..................... | 343/16 M |

Primary Examiner—Richard A. Farley
Assistant Examiner—T. M. Blum
Attorney, Agent, or Firm—Harold Levine; Rene' E. Grossman; Alva H. Bandy

[57] ABSTRACT

A direction finding system has slope control means which enables the system slope to be set at a predetermined value, wherein said system slope is the rate of change in magnitude of a received electrical signal per degree of change in the mechanical angle of signal arrival. The ratio of the first element to the second element of the Fourier series representation of the received signal is decreased in order to increase the system slope. The invention is applicable to any direction finding system which employs sum and difference signal processing techniques.

6 Claims, 4 Drawing Figures

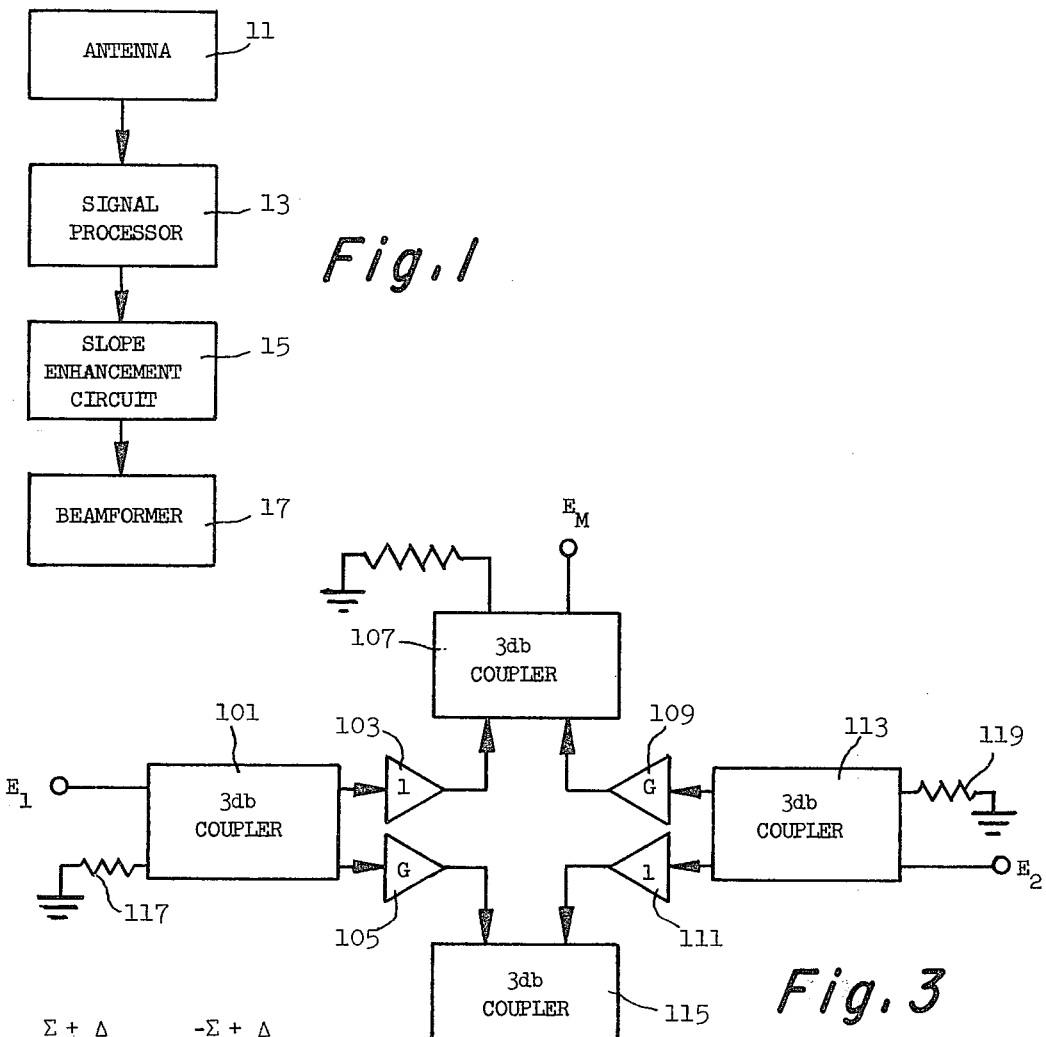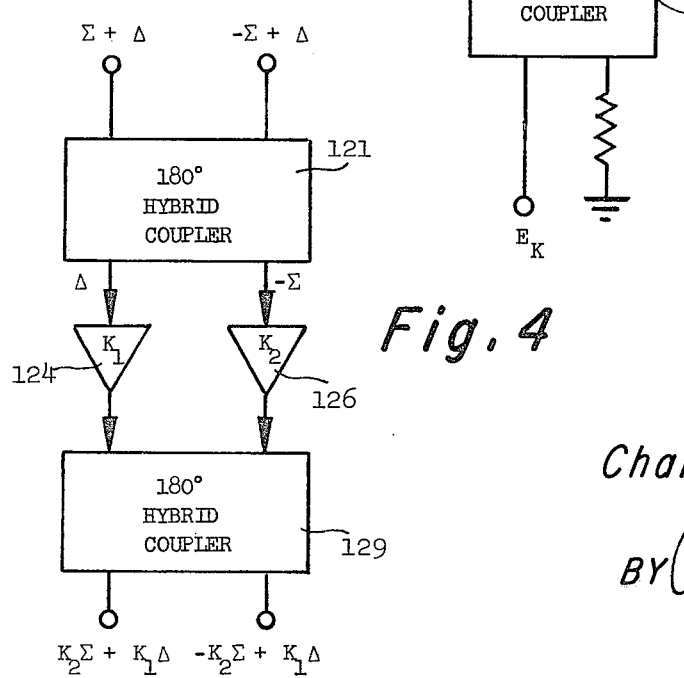

DIRECTION-FINDING SYSTEM HAVING SLOPE CONTROL MEANS

This is a continuation of application Ser. No. 113,401, filed Feb. 8, 1971, now abandoned.

This invention relates generally to direction finding systems, and more particularly to an improvement in the type of direction finding system which employs sum and difference signal processing techniques.

One of the more severe problems affecting the accuracy of a direction finding system is imposed by the tolerance of components and by manufacturing tolerances. The combined effect of such tolerances produces fixed electrical errors in the system. As the magnitude of the system electrical output changes proportionately to changes in the angle of signal arrival, fixed electrical errors result directly in direction finding errors. For example, for a typical direction finding system having a system slope of 0.25 db per degree, an electrical error of 0.5 db will result in a two degree direction finding error.

Also, since the electrical aperture at a selected frequency is dependent upon the antenna circumference, it is a characteristic of antennas having small physical size, and thus small electrical apertures, that as the antenna is made smaller the system slope decreases, increasing the effect of fixed system errors on the system direction finding accuracy. This characteristic has previously resulted in a limitation on the physical size of antennas that could be employed consistent with maintaining a high degree of accuracy. In other words, system accuracy in high frequency direction finding systems has been dependent on the physical size of the antenna; whereas the smaller the antenna, the more prominent the fixed electrical errors in the system become due to decreasing slope. However, it is desirable in most direction finding systems, particularly airborne systems, to provide as small an antenna as practical.

Therefore, an object of the present invention is to provide a direction finding system in which fixed electrical errors in the system are minimized.

Another object of the present invention is to provide a direction finding system in which small antennas can be utilized without decreasing system accuracy.

Other objects and advantages will become apparent from the following detailed description in conjunction with the drawings, in which:

FIG. 1 is a basic block diagram of the direction finding system of the invention;

FIG. 3 is a diagram of an alternate embodiment of the slope enhancement circuit of the invention; and FIG. 4 is a diagram of yet another embodiment of the slope enhancement circuit.

Figure 2:
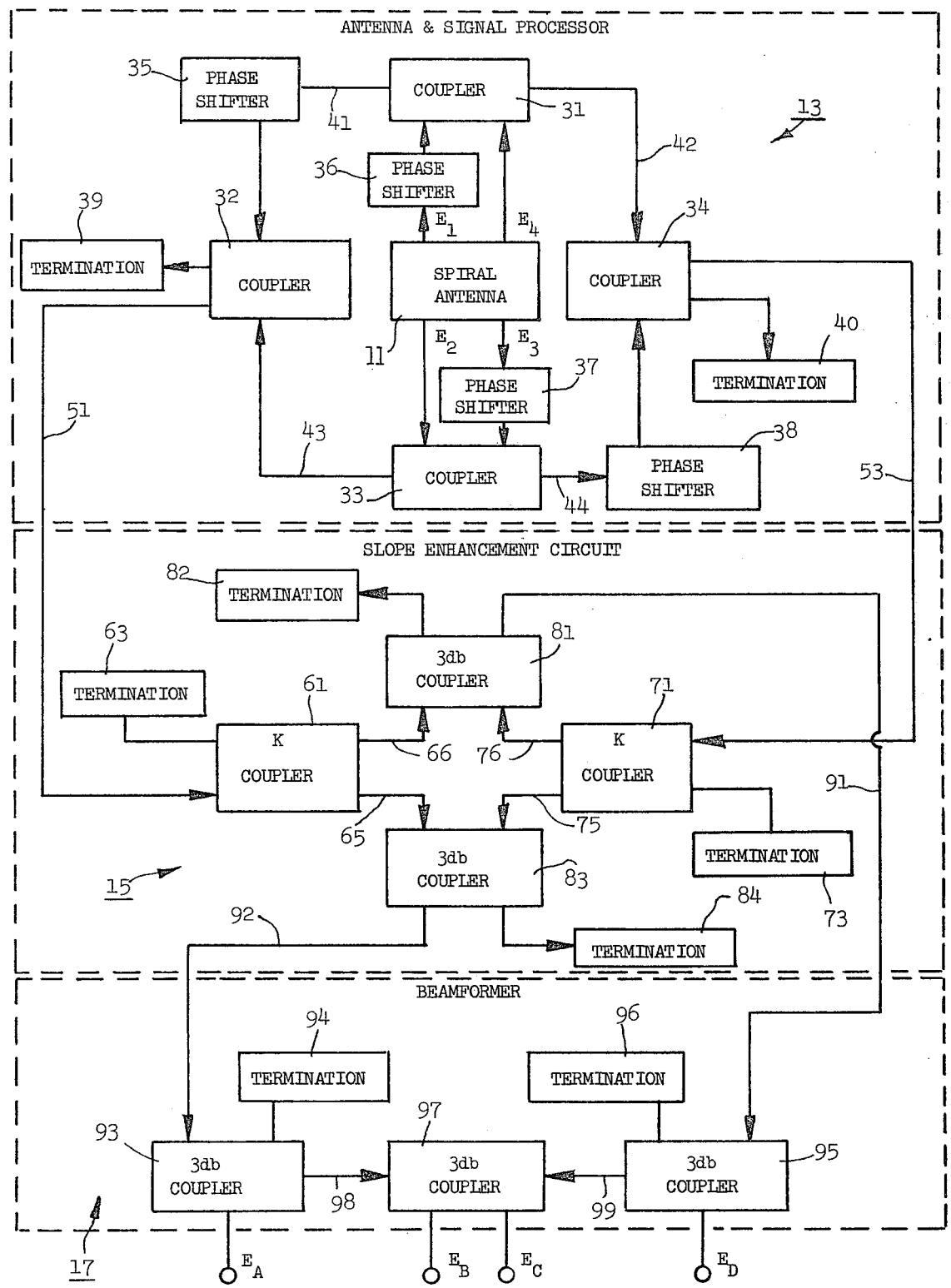
FIG. 2 is a detailed block diagram of the preferred direction finding system.

A periodic electrical signal, such as the electrical output of the antenna, can be expressed in the form of a Fourier series as follows:

$$E = Ae^{jx} + Be^{j2x} + Ce^{j3x} + \ldots \quad (1)$$

where E is the electrical output in volts, the Fourier coefficients (A, B, C, etc.) represent magnitudes, and the phase of each element in the series is a multiple of variable $x$. The essence of a direction finding system is that the Fourier coefficients are proportional to the angle $\theta$ of a polar coordinate system, wherein $\theta$ is measured with respect to the Z axis, and the phase of each element of the series is proportional to the angle $\Phi$ measured in the X-Y plane. Therefore, equation (1) can be expressed as follows:

$$E = A(\theta)e^{j\Phi} + B(\theta)e^{j2\Phi} + C(\theta)e^{j3\Phi} + \quad (2)$$

Each element in the above series is referred to as a mode in the direction finding system, and a typical system utilizes only the first two modes, with subsequent modes being suppressed or removed by signal processing.

The slope of a direction finding system is the rate of change in magnitude of processed electrical signal per degree of change in mechanical angle of signal arrival, typically expressed in decibels/degree. In direction finding systems which employ sum and difference signal processing techniques, the processed signal referred to immediately above comprises the absolute value of the ratio of the sum of the first two modes to the difference thereof. The system slope can be expressed in equation form as follows:

$$\text{Slope} = \frac{d}{d\theta} \left| \frac{\Sigma + \Delta}{-\Sigma + \Delta} \right| \quad (3)$$

where, following accepted terminology, $\Sigma$ is the first mode and $\Delta$ is the second mode, and $\theta$ is measured as stated in the preceding paragraph.

For relatively small values of $\theta$, such as on the order of 20° or less, the magnitude of the $\Sigma$ mode is relatively constant and the magnitude of the $\Delta$ mode is directly proportional to $\theta$. Therefore, equation (3) can be rewritten as follows:

$$\text{Slope} = \frac{d}{d\theta} \left| \frac{1 + \frac{R\theta}{\Sigma}}{1 - \frac{R\theta}{\Sigma}} \right| \quad (4)$$

where $R\theta = \Delta$ and R is a proportionality constant. It can be seen from equation (4) that the system slope can be increased by increasing $^R\Sigma$, ie., by decreasing the magnitude of $\Sigma$ with respect to $\Delta$. Consequently, according to the present invention, the slope is controlled electronically by signal processing, thus minimizing the effects of fixed system errors and enabling the utilization of small antennas in accurate direction finding systems.

One embodiment of the present invention comprises the separation of the $\Sigma$ and $\Delta$ modes of the received signal and then attenuation of the $\Sigma$ mode and/or amplification of the $\Delta$ mode. The $\Sigma$ and $\Delta$ modes are then recombined prior to further processing. In another embodiment of the invention the system slope is varied without electrically separating the $\Sigma$ and $\Delta$ modes. In this latter embodiment, a slope control circuit comprising a plurality of signal couplers varies the ratio of the $\Sigma$ mode to the $\Delta$ mode as a function of the coupling coefficient of a pair of the couplers. In a modification of this latter embodiment amplifiers are inserted between couplers and the slope is varied according to a function of the gain of the amplifiers.

A basic block diagram of the preferred direction finding system is shown in FIG. 1. The system comprises an antenna 11, a signal processor 13, a second signal processor slope enhancement circuit 15 and a beamformer 17. The function of the system is to receive a signal from a source (not shown) and process the received signal to obtain directional information, in order to find the direction to the source from the position of the system. Antenna 11 receives the signal from the source and presents it in electrical form to signal processor 13. Signal processor 13 then processes the received signal to isolate signals representing the sum and difference of the first two elements of the Fourier series representation of the received signal, referred to above as direction finding modes. The slope enhancement circuit effectively decreases the magnitude of the first mode $\Sigma$ with respect to the magnitude of the second mode $\Delta$ to increase the system slope. The beamformer 17 then isolates four direction finding lobes (e.g., left, right, up and down) which contain the directional information. At this point, various means well-known in the art, such as appropriate diode detectors, can be employed to utilize the directional information obtained. A tunnel diode detector, such as that disclosed in the article "Tunnel Diode Detectors", *Microwave Journal*, Jan, 1966, is coupled to each of the four beamformer outputs. Each diode output is a signal having an amplitude proportional to the signal level received from each of the four direction finding lobes. The diode outputs for the left, right signals are then compared in a comparator to determine the left or right position, as are the outputs of the up and down diodes outputs to determine the up, down position. For those desiring additional information concerning the detector, reference is made to Peter C. Sandretto's textbook, *Electronic Avigation Engineering*, 1958 Edition, International Telephone and Telegraph Corporation, Chapter 4, Section 4.4.2 (pp. 161–164).

Although other types of antenna systems can be satisfactorily employed, a spiral antenna is preferable because of its electrical characteristics. as well as its small, compact size. For direction finding systems employing a symmetrical signal processor, such as signal processor 13 herein, the spiral antenna may comprise any even number of filaments. To assure the presence of the first two modes of the received signal in the antenna pattern, the outer antenna circumference is at least twice the wavelength of the lowest frequency to be received. The maximum number of modes which will be received by the antenna is determined by the outer antenna circumference divided by the wavelength at the highest frequency of interest. To facilitate signal processing, the antenna has an even number of filaments equal to or larger than the above maximum number of modes. Outputs from N filaments can be used to process and separate N modes, thus enabling disposal of unwanted modes.

A feature of the spiral antenna that makes it readily adaptable for use in direction finding systems is that the filaments can be physically arranged to produce a fixed phase difference between the filaments for each mode. The embodiment to be described herein employs a four filament spiral antenna in which the respective received signals of each filament are as follows:

$E_1 = A\ (\theta)e^{j\phi} + B\ (\theta)e^{j2\phi} + C\ (\theta)e^{j3\phi} + D\ (\theta)e^{j4\phi}$ $E_2 = jA\ (\theta)e^{j\phi} - B\ (\theta)e^{j2\phi} - jC\ (\theta)e^{j3\phi} + D\ (\theta)e^{j4\phi}$ $E_3 = -A\ (\theta)e^{j\phi} + B\ (\theta)e^{j2\phi} - C\ (\theta)e^{j3\phi} + D\ (\theta)e^{j4}$ (5)

$E_4 = -jA\ (\theta)e^{j\phi} - B\ (\theta)e^{j2\phi} + jC\ (\theta)e^{j3\phi} + D\ (\theta)e^{j4\phi}$ where $\theta$ and $\phi$ are the same as for equation (2) hereinabove.

It can be seen from equation (5) that the first mode for each successive filament is shifted in phase 90° with respect to the same harmonic of the previous filament, the second mode is shifted successively by 180°, the third by 270° and the fourth by 360°. A reference on spiral antennas of the preferred type is "The Equiangular Spiral Antenna", IRE Transactions on Antennas and Propagation (April 1959), by John D. Dyson. Such antennas are well-known, commonly used in direction finding applications and will not be further discussed herein.

The preferred direction finding system will now be described in more detail with reference to FIG. 2. Spiral antenna 11 receives signals in the form of equations (5). As previously stated, the function of the signal processor is to remove unwanted modes and to produce two outputs, one comprising the phasor sum of the first two modes and the other comprising the phasor difference thereof. The signal processor 13 basically comprises signal couplers 31, 32, 33 and 34 and phase shifters 35, 36, 37 and 38. Output $E_1$ (see equation 5) from antenna 11 is shifted in phase and coupled to output $E_4$ from antenna 11 by means of coupler 31. The couplers perform phasor addition or subtraction, with the magnitudes of the signals being modified according to the coupling coefficient. Output $E_3$ is shifted in phase by phase shifter 37 and then combined with output $E_2$ in coupler 33. Output 41 of coupler 31 is then shifted in phase by phase shifter 35 and coupled to output 43 of coupler 33 by means of coupler 32. The outputs of coupler 32 comprise the phasor sum of the first and second modes, which is signal 51, and a phasor combination of the third and fourth modes, which is dissipated by termination 39. Similarly, output 44 of coupler 33 is shifted in phase by phase shifter 38 and coupled to output 42 of coupler 31 by means of coupler 34. Output signal 53 of coupler 34 comprises the desired phasor difference of the first and second modes. The other output of coupler 34 comprises a combination of the third and fourth modes and is eliminated by termination 40. The electrical signals 51 and 53 are of the following form:

$$E_{51} = \Sigma + \Delta$$
$$E_{53} = -\Sigma + \Delta \qquad (6)$$

where $\Sigma$ is the first mode and $\Delta$ is the second mode of the received signal.

The amount of phase shift created by each of the phase shifters of signal processor 13 is related to the coupling coefficient of the couplers, with a large number of combinations being possible to obtain the desired result. Each of the couplers and phase shifters of signal processor 13, as well as those subsequently referred to herein, are conventional. The couplers and phase shifters may be discrete component devices or may be stripline devices, with stripline devices being preferred for most high frequency direction finding applications. For details as to the design of a signal processor such as processor 13, reference may be made to "Synthesis of Hybrid Networks", Final Engineering Report FR 67-14-32, Contract No. N60530-12660; prepared by Hughes Aircraft Co. for Naval Ordnance Test Station, China Lake, Calif.

Slope enhancement circuit 15 provides the improved performance of the direction finding system. As previously stated, this circuit in effect decreases the magnitude of the first mode with respect to the magnitude of the second mode, thereby increasing the system slope and resulting in the advantages previously enumerated.

The input signals to slope enhancement circuit 15 are signals 51 and 53, comprising the phasor sum and difference, respectively, of the first two modes, as shown in equations (6). Signal 51 is fed to coupler 61 which has a coupling coefficient K. The other input to coupler 61 is terminated by means of termination 63. Output 65 is proportional to $K E_{51}$, whereas output 66 is proportional to $-j \sqrt{1-K^2} E_{51}$. Thus, signal 51 is split into two components, one of which is shifted 270° in phase with respect to the other.

Similarly, signal 53 is fed to coupler 71 which also has a coupling coefficient K. The remaining input to coupler 71 is connected to termination 73. Output signal 76 of coupler 71 is proportional to $K E_{53}$, whereas output signal 75 is proportional to $-j \sqrt{1-K^2} E_{53}$. Signals 66 and 76 are connected as inputs to 3-db coupler 81 which has one output port terminated by means of termination 82. Similarly, signals 65 and 75 are connected as inputs to 3-db coupler 83 which has an output port connected to termination 84. The desired outputs, comprising signal 91 from coupler 81 and signal 92 from coupler 83, are of the following form (although reduced in magnitude):

$$E_{91} = \Sigma(\sqrt{1-K^2}-K) + \Delta(\sqrt{1-K^2}+K)$$
$$E_{92} = -\Sigma(\sqrt{1-K^2}-K) + \Delta(\sqrt{1-K^2}+K) \quad (7)$$

It can be seen from equations (7) that the magnitude of the first mode has been decreased with respect to the magnitude of the second mode, since both $\Sigma$ and $\Delta$ have been multiplied by a constant but the constant by which $\Sigma$ is multiplied is smaller than the constant by which $\Delta$ is multiplied.

As previously stated, the system slope is the derivative with respect to $\theta$ of the ratio of the sum of the first two modes to the difference of the first two modes, i.e., $$\text{Slope} = \frac{d}{d\theta} \left| \frac{E_{91}}{E_{92}} \right| \quad (8)$$

By normalizing, the magnitude of the ratio of $E_{91}$ and $E_{92}$ of equations (7) and (8) can be written as follows:

$$\left| \frac{E_{91}}{E_{92}} \right| = \left| \frac{1 + \frac{\Delta(\sqrt{1-K^2}+K)}{\Sigma(\sqrt{1-K^2}-K)}}{1 - \frac{\Delta(\sqrt{1-K^2}+K)}{\Sigma(\sqrt{1-K^2}-K)}} \right| \quad (9)$$

In view of equation (4) and the discussion related thereto, it is apparent that slope enhancement circuit 15 increases the system slope.

The function of beamformer 17 is to process signals 91 and 92 from slope enhancement circuit 15 and present directional information in usable form. Couplers 93, 95 and 97 are preferably 3-db couplers. Signal 92 is connected to coupler 93; the other input to coupler 93 is connected to termination 94. Similarly, signal 91 is fed to coupler 95 which has its other input port terminated at termination 96. Output 98 from coupler 93 and output 99 from coupler 95 are connected to coupler 97. Outputs $E_A$ from coupler 93, $E_D$ from coupler 95 and $E_B$ and $E_C$ from coupler 97 are of the following form:

$$E_A = -0.707 (\Sigma + \Delta)$$
$$E_B = 0.707 e^{j\pi/4} (\Sigma + j\Delta)$$
$$E_C = 0.707 e^{j\pi/4} (-\Sigma + j\Delta) \quad (10)$$
$$E_D = -0.707 (-\Sigma + \Delta).$$

In the above equations (10), signals $E_A$ and $E_D$ contain horizontal directional information and signals $E_B$ and $E_C$ contain vertical directional information. The output signals of the beamformer in any direction finding system which employs sum and difference signal processing techniques are of the form shown above. It therefore will be seen from the description herein that the slope control according to the present invention is applicable to all such direction finding systems.

An alternate embodiment of the slope enhancement circuit 15 illustrated in FIG. 2 is shown in FIG. 3. The slope enhancement circuit of FIG. 3 is similar to enhancement circuit 15, except that in FIG. 3 amplifiers have been inserted between the output ports of the input coupler pair 101, 113 and the input ports of the output coupler pair 107, 115. By selecting input and output couplers all having the same coupling coefficient, preferably all being 3-db couplers, the system slope will be increased as a function of the gain of the amplifiers. Amplifiers 105 and 109 have a normalized gain of G, whereas the normalized gain of amplifiers 103 and 111 is unity. Amplifier pairs 103–111 and 105–109 are closely matched to obtain preferred performance.

In operation, an input signal $E_1$ is connected to one input port of input coupler 101, and the other input port is terminated by resistor 117 which should match the input impedance of the coupler, typically 50 ohms. The signal at the output port of coupler 101 which is connected to unit gain amplifier 103 is of the form $-E_1$, whereas the output signal from coupler 101 connected as an input to amplifier 105 is of the form $-jE_1$. In like manner, input coupler 113 has an input signal $E_2$ with the other input port being terminated by resistor 109. The input to amplifier 119 is of the form $-jE_2$, whereas the input to amplifier 111 is of the form $-E_2$. The output of amplifier 103 and the output of amplifier 109 are connected as inputs to output coupler 107. The output of amplifier 105 and the output of amplifier 111 are connected as inputs to output coupler 115. The unused output port of couplers 107 and 115 is terminated by resistors. If $E_1$ is of the form $\Sigma+\Delta$ (corresponding to signal 51 in FIG. 2) and $E_2$ is of the form $-\Sigma+\Delta$ (corresponding to signal 53 in FIG. 2) then the output signals of the circuit of FIG. 3 are of the following form:

$$E_K = j[-\Sigma(1-G) + \Delta(1+G)]$$
$$E_M = j[\Sigma(1-G) + \Delta(1+G)] \quad (11)$$

Signals $E_K$ and $E_M$ correspond to signals 92 and 91, respectively, in FIG. 2. In view of the previous discussions herein, it can be seen from equations (11) that the circuit of FIG. 3 increases the system slope.

Another embodiment of the slope enhancement circuit of the invention is shown in FIG. 4. In this embodiment, the $\Sigma$ and $\Delta$ modes are isolated, the $\Delta$ mode is amplified with respect to the $\Sigma$ mode or, alternately, the $\Sigma$ mode is attenuated with respect to the $\Delta$ mode and then the processed signals are recombined to form the desired sum and difference signals. Couplers 121 and 129 are 180° hybrid couplers, which are commercially available. Amplifier 124 has a gain $K_1$ and amplifier 126 has a gain $K_2$, where $K_2$ is less than $K_1$. The inputs to coupler 121 are the sum and difference of the signals $\Sigma$ and $\Delta$. The outputs from coupler 121 are the isolated $\Sigma$ and $\Delta$ components. The $\Delta$ mode is amplified by amplifier 124 and the $\Sigma$ mode is amplified a lesser amount by amplifier 126. The amplified $\Sigma$ and $\Delta$ are then recombined by coupler 129 to form sum and difference signals with increased slope. On the same principle, attenuators could be used in the place of amplifiers, with the $\Sigma$ mode being attenuated a greater amount than the $\Delta$ mode.

It will be readily noted from the principles discussed herein that the slope enhancement circuit can be connected directly to the antenna, thus preceding the signal processor. Such an arrangement requires a slope enhancement circuit for each pair of opposing signals, and thus requires additional couplers. For example, by referring to equations (5) it will be noted that signals $E_1$ and $E_3$ have the first two modes of the required form $A+B$ and $-A+B$, respectively. Similarly, the first two modes of signals $E_2$ and $E_4$ are of the form $(jA) + (-B)$ and $-(jA) + (-B)$. Thus, two slope enhancement circuits would be required, one having input signals $E_1$, $E_3$ and the other having input signals $E_2$, $E_4$.

The present invention having been described with reference to particular embodiments thereof, it is to be understood that the described embodiments are intended only as illustrative. Certain modifications which do not depart from the gist of the invention may now suggest themselves to those skilled in the art.

What is claimed is:

1. A direction finding system comprising:
   a. a four-filament planar spiral antenna for receiving a signal;
   b. a first signal processor comprising a first pair of phase shifters coupling the spiral antenna output to a pair of input couplers, a second pair of phase shifters coupling the outputs of the input couplers to a pair of output couplers for forming two signals comprising the phasor sum and difference of two mode components;
   c. second signal processing means for decreasing the magnitude of one mode component for each of said two signals with respect to the magnitude of a second mode component for each of said two signals to increase the system slope;
   d. a third signal processing means for forming two pairs of signals, one of said pairs comprising directional information in the horizontal plane and the other of said pairs comprising directional information in the vertical plane; and
   e. means for utilizing the signals to determine direction.

2. The system of claim 1, wherein said third signal processing means comprises three 3-db couplers, with two of said 3-db couplers comprising input couplers and the third thereof connected to one output port of each of said input couplers.

3. The system of claim 1, wherein said second signal processing means comprises a pair of input couplers having a coupling coefficient K and a pair of output 3-db couplers and wherein the system is varied according to a function of K.

4. The system of claim 1, wherein said second signal processing means comprises a pair of input couplers and a pair of output couplers and further comprises four amplifiers connected therebetween, two of said amplifiers having a normalized gain of unity and the other two thereof having a normalized gain of G, and wherein the system slope is increased according to a function of G.

5. The system of claim 4, wherein said input couplers and said output couplers are 3-db couplers.

6. The system of claim 1, wherein said second signal processing means comprises an input 180° hybrid coupler, an attenuator having an attenuation factor $K_1$, an attenuator having an attenuation factor $K_2$ where $K_2$ is not equal to $K_1$, and an output 180° hybrid coupler, with both attenuators being connected between the input coupler and the output coupler.

* * * * *